350-374
OR 4,229,073

United States
Lotspeich

4,229,073
[45] Oct. 21, 1980

[54] ISO-INDEX COUPLED-WAVE ELECTRO-OPTIC FILTERS

[75] Inventor: James F. Lotspeich, Malibu, Calif.

[73] Assignee: Hughes Aircraft Company, Culver City, Calif.

[21] Appl. No.: 65,704

[22] Filed: Aug. 10, 1979

[51] Int. Cl.$^3$ .............................................. G02F 1/03
[52] U.S. Cl. .................................................. 350/150
[58] Field of Search ............................... 350/150, 157

[56] References Cited
PUBLICATIONS

Bhar et al., "Silver Thiogallate (AgGaS$_2$)-Part II: Linear Optical Properties," *IEEE Journal of Quantum Electronics*, vol. QE-10, No. 7, (Jul. 1974), pp. 546-550.
Henry, C. H., "Coupling of Electromagnetic Waves in CdS," *Physical Review*, vol. 143, No. 2, (Mar. 1966), pp. 627-633.
Laurenti et al., "Optical Filters Using Coupled Light Waves in Mixed Crystals," *Applied Physics Letters*, vol. 28, No. 4, (15 Feb. 1976), pp. 212-213.
Laurenti et al., "Graded-Composition Semiconductors as Tunable Narrow-Band Optical Filters," *Journal of Applied Physics*, vol. 48, No. 1, (Jan. 1977), pp. 203-204.
Pinnow et al., "An Electro-Optic Tunable Filter," *Applied Physics Letters*, vol. 34, No. 6, (15 Mar. 1979), pp. 391-393.

*Primary Examiner*—John K. Corbin
*Assistant Examiner*—R. A. Rosenberger
*Attorney, Agent, or Firm*—Paul M. Coble; W. H. MacAllister

[57] ABSTRACT

Narrow-band optical filters are disclosed utilizing a birefringent crystal exhibiting a change in sign in birefringence at a predetermined wavelength and relying upon wave coupling between ordinary and extraordinary polarizations of light at or near the predetermined wavelength. The crystal is disposed along the light path between appropriately oriented polarizers, and a dc electric field is applied to the crystal either parallel or perpendicular to the light path. The dc electric field produces the aforementioned wave coupling for light at the center wavelength of the filter which normally is equal to the predetermined wavelength. The filter center wavelength may be displaced from the predetermined wavelength by employing a spatially periodic electric field.

8 Claims, 8 Drawing Figures

ISO-INDEX COUPLED-WAVE ELECTRO-OPTIC FILTERS

The invention described herein was made in the course of or under a contract or subcontract thereunder with the U.S. Navy.

TECHNICAL FIELD

This invention relates to optical filters, and more particularly it relates to narrow-band optical filters utilizing a birefringent crystal exhibiting a change in sign in birefringence at a predetermined wavelength and relying upon wave coupling of orthogonal polarizations of light at or near the predetermined wavelength.

BACKGROUND ART

In crystals that exhibit birefringence, the birefringence is generally a function of wavelength, and narrow-band optical filters have been disclosed based on a change of sign of birefringence which occurs at a predetermined wavelength in certain uniaxial semiconductor crystals such as ZnO, CdS, $CdS_{1-x}Se_x$ and $Zn_{1-x}Cd_xS$. The crystal is disposed between either crossed or parallel polarizers, and coupling of light energy between ordinary and extraordinary polarizations at the predetermined wavelength is effected by applying a magnetic field or stress to the crystal. Further details concerning optical filters to the foregoing type may be found in the papers, C. H. Henry, "Coupling of Electromagnetic Waves in Cds", *Physical Review*, Vol. 143, No. 2 (March 1966), pages 627–633; J. P. Laurenti et al, "Optical Filters Using Coupled Light Waves in Mixed Crystals", *Applied Physics Letters*, Vol. 28, No. 4 (Feb. 15, 1976), pages 212–213; and J. P. Laurenti et al, "Graded-Composition Semiconductors as Tunable Narrow-Band Optical Filters", *Journal of Applied Physics*, Vol. 48, No. 1 (January 1977), pages 203–204.

Electronically tunable optical filters have been provided wherein a spatially periodic dc electric field applied to a birefringent medium disposed between appropriately oriented polarizers is utilized to electronically program the filter with a wide variety of transmission characteristics. This filter relies upon a type of electro-optic effect that produces an effective optic axis rotation in the birefringent medium while the magnitude of the birefringence remains constant over the entire wavelength range of interest. For further details concerning this type of electronically tunable filter, reference may be made to patent application Ser. No. 864,356, filed Dec. 27, 1977, by D. A. Pinnow et al, "Electro-Optic Tunable Optical Filter", and assinged to the assignee of the present invention, and to the paper by D. A. Pinnow et al, "An Electro-Optic Tunable Filter", *Applied Physics Letters*, Vol. 34, No. 6 (Mar. 15, 1979), pages 391–393.

SUMMARY OF THE INVENTION

It is an object of the present invention to provide a narrow-band optical filter of the type relying upon a change in the magnitude of birefringence at a predetermined wavelength where the birefringence changes sign, and which filter is smaller, lighter, simpler and requires less power than prior art filters of this type.

It is a further object of the invention to provide an optical filter of the foregoing type which additionally has no moving parts and is capable of being switched on or off faster than in the prior art.

It is still another object of the invention to provide an optical filter having a wider field of view and higher wavelength selectivity (narrowness of passband) than electro-optically tunable optical filters of the prior art.

An optical filter according to the invention includes first and second polarizers spaced from one another along a light path and having their respective pass directions for polarized light oriented at a desired angular relationship with respect to one another. A crystal of birefringent material in which the birefringence becomes zero and changes sign at a predetermined wavelength is disposed along the light path between the first and second polarizers and is oriented with its optic axis perpendicular to the light path. Light at a plurality of wavelengths including a preselected wavelength in the vicinity of the predetermined wavelength is directed through the first polarizer and the crystal along the aforementioned path. A dc electric field is applied to the crystal to produce wave coupling therein between ordinary and extraordinary polarizations of light at the preselected wavelength, whereby light at the preselected wavelength is selectively passed or blocked by the second polarizer.

Additional objects, advantages, and characteristic features of the invention will become readily apparent from the following detailed description of preferred embodiments of the invention when considered in conjunction with the accompanying drawings.

DETAILED DESCRIPTION OF THE INVENTION

Figure 1:
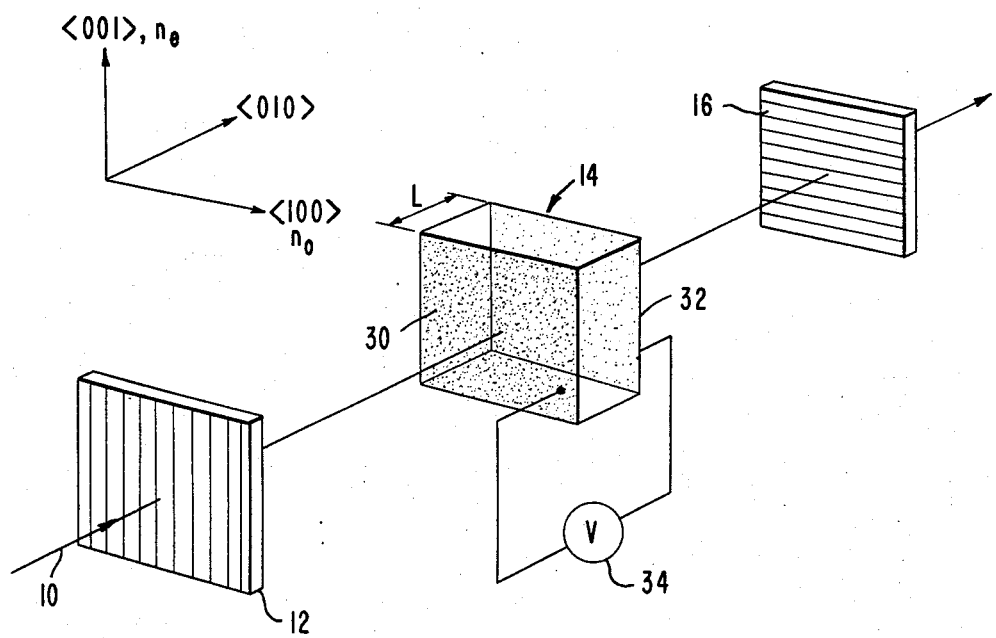
FIG. 1 is a perspective view illustrating an optical filter according to one embodiment of the invention.

Referring to FIG. 1 with greater particularity, an optical filter according to the invention is shown in which light propagating along path 10 first passes through an input polarizer 12 which establishes a desired linear polarization for the light. The light then propagates through a birefringent crystal 14 to be described in more detail below, after which it is applied to an output polarizer, or analyzer, 16 which passes light polarized along a direction bearing a preselected angular relationship to the direction of polarization of the light emerging from the input polarizer 12. When the polarizer 12 and the analyzer 16 are oriented with their respective pass directions perpendicular to one another as shown in FIG. 1, a bandpass filter is provided wherein the output light emerging from the analyzer 16 consists of a selected wavelength or narrow wavelength range within the wavelength range of the input light applied to the polarizer 12. However, polarizer 12 and analyzer 16 may be oriented with their respective pass directions parallel to one another, in which case a stop band filter would be provided wherein the output light from the analyzer 16 would include all wavelengths within the wavelength range of the input light except for a selected wavelength or narrow wavelength range to be blocked.

Figure 2:
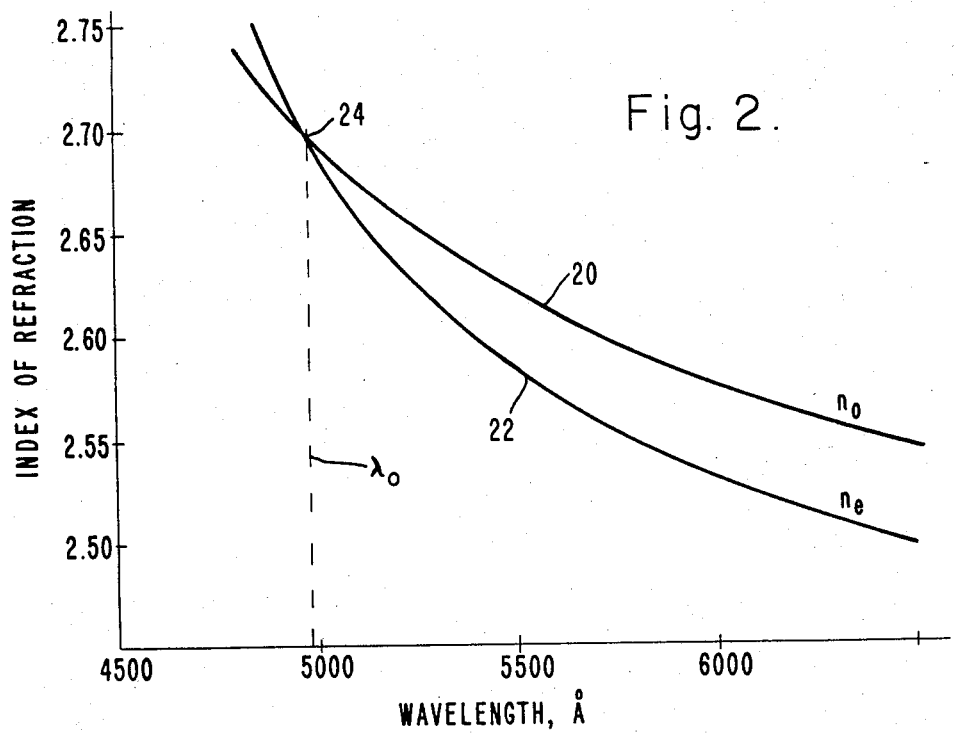
FIG. 2 is a graph plotting the indices of refraction as a function of wavelength for an exemplary crystal material used in the filter of FIG. 1.

In a filter according to the invention the crystal 14 must be of a birefringent material wherein the birefringence becomes zero and changes sign at a predetermined wavelength equal to or near the center wavelength desired to be passed or stopped by the filter. An example of a crystal material exhibiting such birefringence is silver gallium sulfide ($AgGaS_2$), alternatively known as silver thiogallate. A graph showing the indices of refraction as a function of wavelength for $AgGaS_2$ is given in FIG. 2. In FIG. 2 curve 20 represents the ordinary index of refraction $n_o$, while curve 22 depicts the extraordinary index of refraction $n_e$. It may be seen from FIG. 2 that the indices of refraction $n_o$ and $n_e$ become equal and cross one another at an isotropic point 24 corresponding to a wavelength $\lambda_o$ of 4970 Å. It may further be seen from FIG. 2 that for wavelengths longer than 4970 Å the birefringence $\Delta n = n_e - n_o$ is negative, while for wavelengths shorter than 4970 Å the birefringence is positive.

It is pointed out that $AgGaS_2$ is merely one exemplary material exhibiting the birefringent characteristics depicted in FIG. 2, and other materials which possess such characteristics also may be used for the crystal 14. Examples of such materials are cadmium sulfide (CdS), zinc oxide (ZnO), and cadmium selenide (CdSe). $AgGaS_2$ is preferred, however, because it exhibits a greater rate of change in birefringence as a function of wavelength adjacent to the isotropic point. It is further pointed out that mixed crystals of $AgGaS_2$ including appropriate fractional compositions of additional elements may be employed to adjust the isotropic point away from the 4970 Å value which occurs for pure $AgGaS_2$. For example, isotropic points longer than 4970 Å may be achieved with $Ag(Ga,In)S_2$ or $AgGa(S,Se)_2$, while isotropic points shorter than 4970 Å may be achieved with $Ag(Al,Ga)S_2$.

In the ensuing discussion conventional crystallographic momenclature will be employed as described in the book *Chemical Crystallography*, by C. W. Bunn, Oxford University Press, London, 1961, pages 24–28. In accordance with this nomenclature <100> represents the crystallographic X-direction, <010> represents the crystallographic Y-direction, and <001> represents the crystallographic Z-direction.

Referring again to FIG. 1, the crystal 14 is shown as oriented with its optic axis along the <001> direction, the polarizer 14 passes light polarized along the <001> direction, the analyzer 16 passes light polarized along the <100> direction, and the light propagates along the <010> direction. It is pointed out that the aforementioned specific orientation is only exemplary, and other specific orientations of the various components are also suitable and may be employed instead, although in all cases the optic axis of the crystal should be perpendicular to the direction of light propagation. For example, in the arrangement of FIG. 1 the respective orientations of the polarizer 12 and the analyzer 16, or the crystallographic <010> and <100> directions, may be interchanged from those illustrated. Further, although the crystal ($AgGaS_2$) is of the $\bar{4}2m$ symmetry class, it should be understood that other crystal classes are also suitable and may be employed.

In order to apply an electric field across the crystal 14, electrodes 30 and 32 are attached to the opposite surfaces of the crystal 14 disposed perpendicular to the light propagation path 10, and a voltage source 34 generating a dc voltage of magnitude V is connected between the electrodes 30 and 32. Thus, in the embodiment of FIG. 1 the electric field is applied to the crystal 14 along a direction parallel to the light propagation path. Alternatively, the electric field may be applied to the crystal along a direction transverse to the light propagation path, and embodiments of the invention utilizing transverse electric fields are discussed below. In the embodiment of FIG. 1, the electrodes 30 and 32 must be of a material transparent to the light wavelengths of interest, an example of a specific illustrative electrode material being indium-tin oxide (ITO), although it should be understood that other materials are also suitable and may be employed.

When an electric field E is applied to the crystal 14 by means of the voltage source 34 and the electrodes 30 and 32, a rotation of the optic axis of the crystal through an angle $\alpha$ occurs in a plane perpendicular to the direction of light propagation according to the relationship $$\tan 2\alpha = 2n_o^2 n_e^2 r_{41} E / (n_o^2 - n_e^2), \tag{1}$$

where $n_o$ and $n_e$ are the respective ordinary and extraordinary indices of refraction for the crystal 14, and $r_{41}$ is the relevant electro-optic coefficient. For wavelengths away from the wavelength $\lambda_o$ at the isotropic point, the rotation angle $\alpha$ is very small, as shown by index of refraction vectors 35 and 36 of FIG. 3. Thus, light entering the crystal 14 with its polarization parallel to the original optic axis will essentially maintain that direction of polarization through the crystal 14 and will be blocked by the analyzer 16. Also, the respective magnitudes of the indices of refraction $n_o$ and $n_e$ remain constant to the first order in E.

Figure 3:
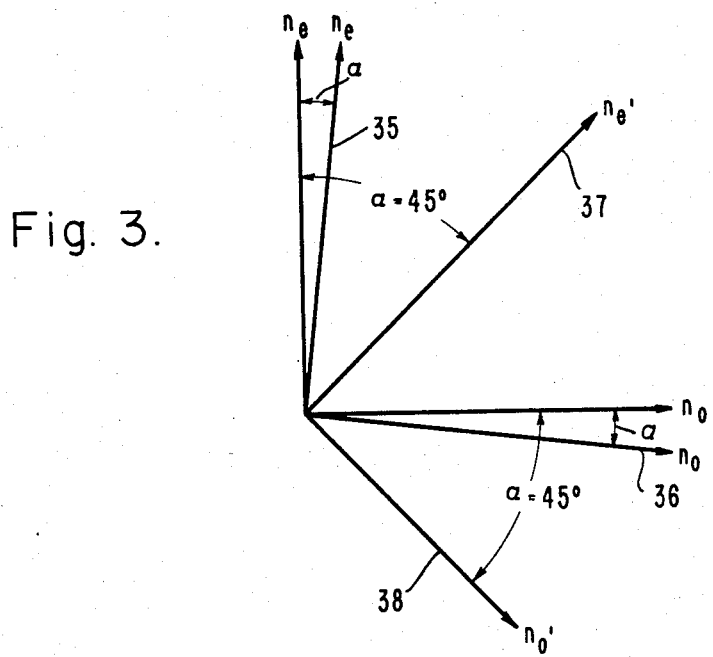
FIG. 3 is a vector diagram of the crystal indices of refraction used in explaining the operation of the filter of FIG. 1.

When the light passing through the crystal 14 is at the wavelength $\lambda_o$, the birefringence $n_e - n_o$ becomes zero, the right side of Equation (1) becomes infinite, and the angle $\alpha$ abruptly shifts to 45°. For this condition, which is illustrated in FIG. 3 by vectors 37 and 38, the respective indices of refraction $n_e$ and $n_o$ assume new magnitudes $n_e'$ and $n_o'$ respectively, given by $$n_e' = \bar{n} + (\bar{n}^3/2) r_{41} E, \tag{2}$$

$$n_o' = \bar{n} + (\bar{n}^3/2) r_{41} E, \tag{3}$$

where $\bar{n}$ is the average value of $n_e$ and $n_o$ and where $n_e$ is assumed to be greater than $n_o$.

For light at the wavelength $\lambda_o$, the crystal 14 functions like a classic Pockels cell, and light entering the crystal 14 polarized parallel to the original optic axis emerges from the crystal 14 elliptically polarized in general. However, when the relative phase retardation of the two "eigen-states" of polarization satisfies the relation $$2\Gamma L = (2\pi L/\lambda_o)\bar{n}^3 r_{41} E = \pi, \quad (4)$$

where L is the length of the crystal along the direction of light propagation, light at the wavelength $\lambda_o$ will be rotated by 90° and be totally transmitted by the analyzer 16. Thus, for maximum transmission through the filter the voltage V applied across the crystal 14 should be equal to the half-wave voltage $V_\pi$ given by $$V_\pi = \lambda_o/2\bar{n}^3 r_{41} \quad (5)$$

The transmission $\tau$ for a filter according to the invention can be derived from coupled-mode theory to be given by $$\tau = \frac{(\Gamma L)^2 \sin^2\sqrt{(\Gamma L)^2 + (\frac{\Delta k L}{2})^2}}{(\Gamma L)^2 + (\frac{\Delta k L}{2})^2} \quad (6)$$

where $\Delta k$ is a phase mismatch term given by $$\Delta k = (2\pi/\lambda)(n_e - n_o) \quad (7)$$

When the birefringence becomes zero, $\Delta k = 0$, and Equation (6) reduces to $$\tau = \sin^2(\Gamma L). \quad (8)$$

As a specific example for illustrative purposes, an optical filter according to FIG. 1 and employing AgGaS$_2$ as the crystal material may be constructed using the specific exemplary parameter values given below in Table I, although it should be understood that other parameter values are also suitable and may be employed.

TABLE I

| Parameter | Exemplary Value |
|---|---|
| $\lambda_o$ | 4970 Å |
| L | 1 cm |
| $\bar{n}$ | 2.7 |
| $r_{41}$ | $3.2 \times 10^{-12}$ m/V |
| $V_\pi$ | 3.9 kV |
| 3-dB passband | 0.2 Å |

Figure 4:
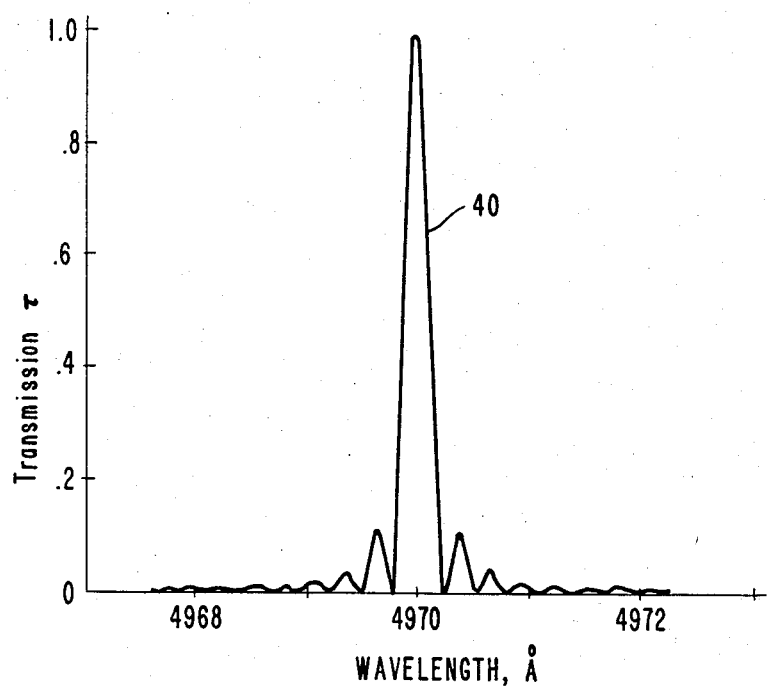
FIG. 4 is a graph showing the transmission as a function of wavelength for an exemplary filter constructed according to FIG. 1.

The transmission $\tau$ as a function of wavelength for an optical filter according to FIG. 1 using the parameter values of Table I is illustrated by curve 40 of FIG. 4. It may be seen from FIG. 4 that a filter according to FIG. 1 provides a passband having a very sharp resonance (high wavelength selectivity) centered at 4970 Å. The reason for this high selectivity is that the crystal birefringence changes rapidly with wavelength in the immediate vicinity of the isotropic point, and the filter selectivity is determined by the rate of change of the birefringence rather than by the birefringence itself. Specifically, for AgGaS$_2$, $(d/d\lambda)(n_e - n_o) = 1.87$ $\mu m^{-1}$ at 4970 Å.

A further feature of an optical filter according to FIG. 1 is that it can accommodate an extremely wide field of view which in principle approaches a hemisphere. The physical reason for this wide field of view is that optical phase matching occurs for all input angles at the wavelength $\lambda_o$ where the birefringence becomes zero.

Figure 5:
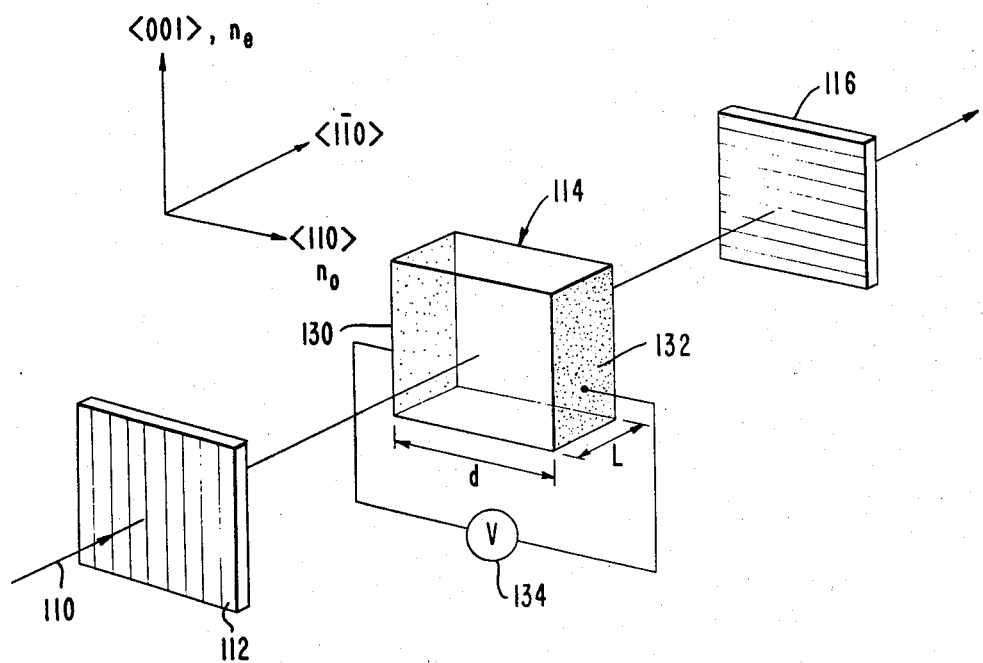
FIG. 5 is a perspective view illustrating an optical filter according to another embodiment of the invention.

As was mentioned above, an optical filter according to the invention may be constructed with the electric field applied to the crystal along a direction transverse to the light propagation direction. An embodiment of the invention utilizing a transverse electric field is illustrated in FIG. 5. Components in the embodiment of FIG. 5 which are the same as or which function equivalently to corresponding components in the embodiment of FIG. 1 are designated by the same second and third reference numeral digits as their corresponding components in FIG. 1, along with the addition of a prefix numeral "1".

In the embodiment of FIG. 5 crystal 114 is oriented along a new Cartesian set of axes that have been rotated about the optic axis 45° from the principal crystallographic axes. More specifically, in FIG. 5, <110> represents the new X-axis, <1$\bar{1}$0> represents the new Y-axis, and <001> represents the Z-axis (optic axis). In the specific arrangement shown in FIG. 5, crystal 114 is orientated with the <1$\bar{1}$0> direction parallel to the light propagation path and with the electric field applied along the <110> direction. It is pointed out, however, that the <110> and <1$\bar{1}$0> directions may be interchanged so that the light propagates through the crystal 114 along the <110> direction and the electric field is applied along the <1$\bar{1}$0> direction.

In the embodiment of FIG. 5, electrodes 130 and 132 are disposed on opposite side surfaces of the crystal 114 in respective planes parallel to the direction of light propagation. Thus, since light does not pass through the electrodes 130 and 132, these electrodes may be of a material such as aluminum or gold, for example, which is not transparent to the light. Further, in the embodiment of FIG. 5 the half-wave voltage $V_\pi$ resulting in maximum transmission through the filter is dependent upon the transverse crystal dimension d (i.e., the spacing between the electrodes 130 and 132) in accordance with the relation $$V_\pi = \lambda_o d/2\bar{n}^3 r_{41} L \quad (9)$$

Thus, with a AgGaS$_2$ crystal 114 of dimensions L=2 cm and d=1 cm, maximum transmission of light at 4970 Å with a 3-dB passband of 0.1Å can be achieved using a half-wave voltage $V_\pi$ of 1.95 kV. The field-of-view properties of the embodiment of FIG. 5 are the same as those of the embodiment of FIG. 1.

In the foregoing embodiments the center wavelength of the filter corresponds exactly to the wavelength $\lambda_o$ where the birefringence is zero. However, since the absorption of light in the crystal usually is relatively high at this wavelength, the filter transmission can be increased by operating at a wavelength slightly removed from that corresponding to the isotropic point.

Figure 6:
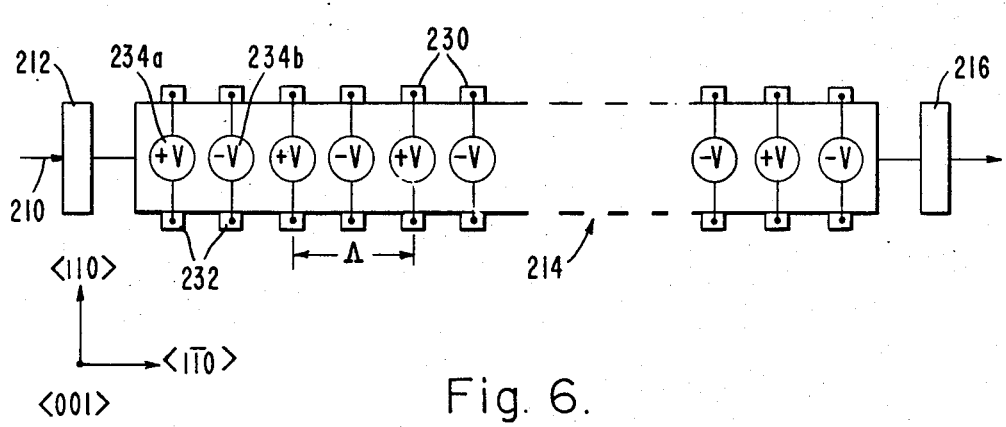
FIG. 6 is a longitudinal side view showing an optical filter according to a further embodiment of the invention.

In a further embodiment of the invention, illustrated in FIG. 6, the center wavelength of the filter is shifted slightly away from the isotropic point to increase the filter transmission while preserving its high selectivity characteristics. Components in the embodiment of FIG. 6 which are the same as or which function equivalently to corresponding components in the embodiment of FIG. 1 are designated by the same second and third reference numeral digits as their corresponding components in FIG. 1, along with the addition of a prefix numeral "2".

In the embodiment of FIG. 6, crystal 214 is elongated along the direction of light propagation, and a spatially periodic dc electric field of period $\Lambda$ is applied to the crystal 214 along the direction of light propagation. The orientation of the crystal 214 of FIG. 6 is similar to that of the crystal 114 of FIG. 5, namely, light propagates through the crystal 214 along the $<1\bar{1}0>$ direction (which represents a 45°-rotated Y-axis) and the electric field is applied to the crystal along the $<110>$ direction (which represents a 45°-rotated X-axis), although the $<110>$ and $<1\bar{1}0>$ directions may be interchanged in the arrangement of FIG. 6. As in the previous embodiments, the $<001>$ direction represents the crystallographic Z-axis and coincides with the optic axis of the crystal. The periodic electric field may be applied to the crystal 214 by successively connecting voltage sources 234a and 234b of successively alternating polarity between sucessive aligned pairs of electrode strips 230 and 232 on opposite lateral surfaces of the crystal 214. The magnitude $V_\pi$ of the voltage provided by the sources 234a and 234b for maximum transmission through the filter of FIG. 6 is given by $$V_\pi = \lambda_o d/\bar{n}^3 r_{41} L. \tag{10}$$

Figure 7:
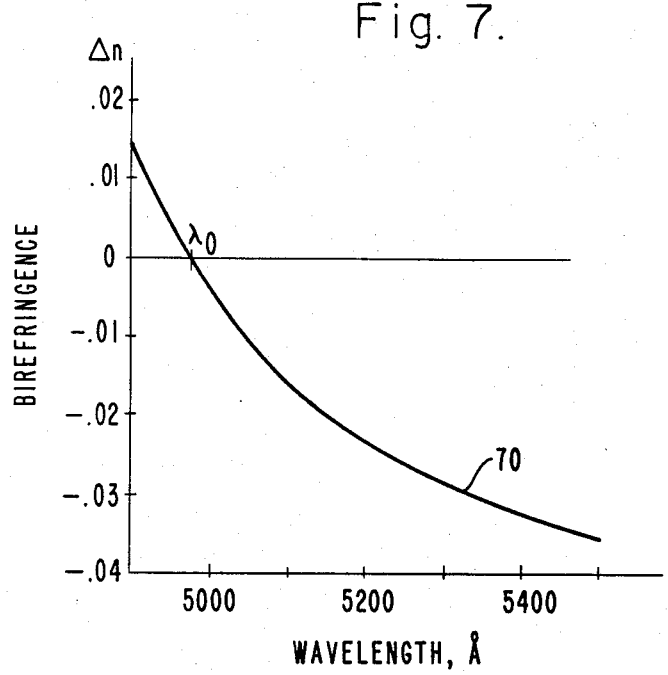
FIG. 7 is graph illustrating the birefringence as function of wavelength for an exemplary crystal material used in filters according the invention.
Figure 8:
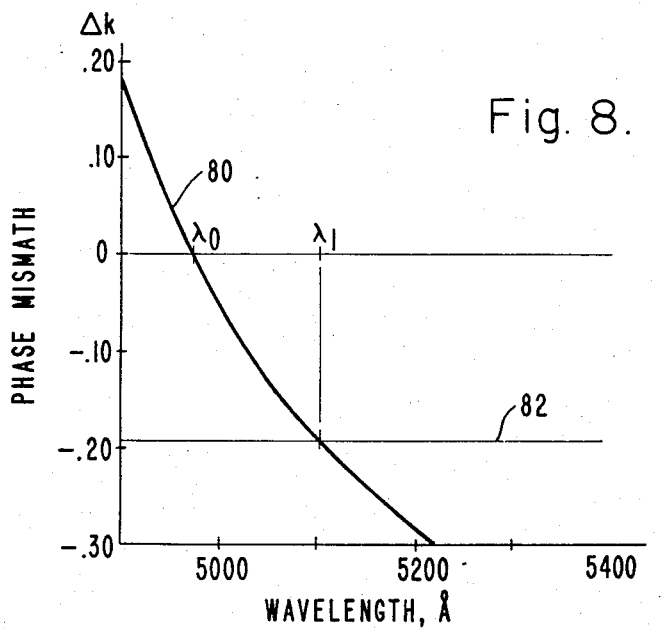
FIG. 8 is a graph showing the phase mismatch as a function of wavelength for filters according to the invention and used in explaining the operation of the embodiment of FIG. 6.

The manner in which the use of a spatially periodic electric field is able to advantageously shift the center wavelength away from the wavelength $\lambda_o$ at the isotropic point will now be discussed with reference to FIGS. 7 and 8. In FIG. 7 curve 70 illustrates the birefringence $\Delta n$ as a function of wavelength for $AgGaS_2$ in the vicinity of the wavelength $\lambda_o$, while curve 80 of FIG. 8 shows the phase mismatch term $\Delta k$ given by Equation (7).

By ignoring quadratic and higher order terms in a Taylor series expansion of the birefringence as a function of wavelength for a filter according to the invention having a center wavelength equal to the wavelength $\lambda_o$, Equation (7) may be rewritten as $$\Delta K \approx (2\pi/\lambda)C(\lambda - \lambda_o), \tag{11}$$

where C is the rate of change of birefringence with wavelength, i.e.

$$C = (d/d\lambda)(n_e - n_o) = d\Delta n/d\lambda. \tag{12}$$

When a spatially periodic electric field of period $\Lambda$ is applied to the crystal 214 (instead of a simple unidirectional electric field), the phase mismatch expression Equation (10), becomes $$\Delta k = (2\pi/\lambda)C(\lambda - \lambda_o) - 2\pi/\Lambda, \tag{13}$$

where the additional term represents a propagation constant $K = 2\pi/\lambda$. The propagation constant K is shown by line 82 in FIG. 8 for a period $\Lambda = 32$ μm. The phase mismatch term $\Delta k$ of Equation (13) becomes zero at a new wavelength $\lambda_1$ corresponding to the point where curves 80 and 82 intersect. For the particular exemplary parameters depicted in FIG. 8, $\lambda_1 \approx 5100$ Å (C=0.867 μm$^{-1}$ at λ=5100 Å).

By shifting the center wavelength of the filter to the wavelength $\lambda_1$ away from the wavelength $\lambda_o$ at the isotropic point, optical absorption in the birefringent crystal is reduced. Thus, the embodiment of FIG. 6 is able to provide higher optical transmission than the embodiments of FIG. 1 or 5. However, this increased transmission is achieved at the expense of a slightly smaller wavelength selectivity (due to a slower rate of change of birefringence with wavelength at the new wavelength $\lambda_1$) and also a reduction in the field of view.

Although the present invention has been shown and described with reference to particular embodiments, nevertheless, various changes and modifications which are obvious to a person skilled in the art to which the invention pertains are deemed to lie within the spirit, scope, and contemplation of the invention.

I claim:

1. An optical filter comprising:
   first and second polarizers spaced from one another along a predetermined path and having their respective pass directions for polarized light oriented at a desired angular relationship with respect to one another;
   a crystal of birefringent material in which the birefringence becomes zero and changes sign at a predetermined wavelength disposed along said path between said first and second polarizers and oriented with its optic axis perpendicular to said path;
   means for directing light at a plurality of wavelengths including a preselected wavelength in the vicinity of said predetermined wavelength through said first polarizer and said crystal along said path; and
   means for applying a dc electric field to said crystal to produce wave coupling therein between ordinary and extraordinary polarizations of light at said preselected wavelength, whereby light at said preselected wavelength is selectively passed or blocked by said second polarizer.

2. An optical filter according to claim 1 wherein said preselected wavelength is equal to said predetermined wavelength.

3. An optical filter according to claim 1 wherein said crystal is oriented with a preselected crystallographic direction selected from the group consisting of the $<010>$ direction and the $<100>$ direction parallel to said path, and said electric field is applied to said crystal along said preselected crystallographic direction.

4. An optical filter according to claim 3 wherein said means for applying said electric field to said crystal includes first and second electrodes disposed on opposite surfaces of said crystal in respective planes perpendicular to said preselected crystallographic direction and means for applying a voltage of magnitude V between said first and second electrodes, said magnitude V being given approximately by $$V = \lambda/2\bar{n}^3 r$$

where λ is said preselected wavelength, $\bar{n}$ is the average value of the ordinary and extraordinary indices of refraction for said crystal, and r is the relevant electro-optic coefficient.

5. An optical filter according to claim 1 wherein said crystal is oriented with a first crystallograhic direction selected from the group consisting of the $<110>$ direction and the $<1\bar{1}0>$ direction parallel to said path, and said electric field is applied to to said crystal along a second crystallographic direction selected from the group consisting of the $<110>$ direction and the $<1\bar{1}0>$ direction and perpendicular to said first crystallographic direction.

6. An optical filter according to claim 5 wherein said means for applying said electric field to said crystal includes first and second electrodes disposed on opposite surfaces of said crystal in respective planes perpendicular to said second crystallographic direction and means for applying a voltage of magnitude V between said first and second electrodes, said magnitude V being given approximately by $$V = \lambda d / 2\bar{n}^3 rL.$$

where $\lambda$ is said preselected wavelength, $\bar{n}$ is the average value of the ordinary and extraordinary indices of refraction for said crystal, $r$ is the relevant electro-optic coefficient, $L$ is the dimension of said crystal along said first crystallographic direction, and $d$ is the dimension of said crystal along said second crystallographic direction.

7. An optical filter comprising:
   first and second polarizers spaced from one another along a predetermined path and having their respective pass directions for polarized light oriented at a desired angular relationship with respect to one another;
   a crystal of birefringent material in which the birefringence becomes zero and changes sign at a predetermined wavelength disposed along said path between said first and second polarizers and oriented with its optic axis perpendicular to said path;
   means for directing light at a plurality of wavelengths including a preselected wavelength in the vicinity of said predetermined wavelength through said first polarizer and said crystal along said path; and
   means for applying to said crystal a dc electric field which spatially periodically varies along said path with a period $\Lambda$ satisfying the relation $$(2\Pi/\lambda)C(\lambda - \lambda_o) - (2\Pi/\Lambda) = 0,$$

where $\lambda$ is said preselected wavelength, $\lambda_o$ is said predetermined wavelength, and $C$ is the rate of change of the birefringence of said crystal with respect to wavelength at said preselected wavelength to produce in said crystal wave coupling between ordinary and extraordinary polarizations of light at said preselected wavelength, whereby light at said preselected wavelength is selectively passed or blocked by said second polarizer.

8. An optical filter according to any of claims 1, 2, 3, 4, 5, 6, or 7 wherein said crystal is of $AgGaS_2$.

* * * * *

UNITED STATES PATENT AND TRADEMARK OFFICE
CERTIFICATE OF CORRECTION

PATENT NO. : 4,229,073
DATED : October 21, 1980
INVENTOR(S) : JAMES F. LOTSPEICH It is certified that error appears in the above—identified patent and that said Letters Patent is hereby corrected as shown below:

IN THE SPECIFICATION:

Column 4, line 58, equation (3), delete

"$n_o' = \bar{n} + (\bar{n}^3/2) r_{41} E,$" and substitute therefor

--$n_o' = \bar{n} - (\bar{n}^3/2) r_{41} E,$--.

IN THE CLAIMS:

Claim 7, column 10, line 9, delete

"$(2\Pi/\lambda) C (\lambda - \lambda_o) - (2\Pi/\Lambda) = 0,$"

and substitute therefor

--$(2\pi/\lambda) C (\lambda - \lambda_o) - (2\pi/\Lambda) = 0,$--.

Signed and Sealed this

Third Day of March 1981

[SEAL]

Attest:

RENE D. TEGTMEYER

Attesting Officer    Acting Commissioner of Patents and Trademarks